United States Patent
Miyatake et al.

(10) Patent No.: US 6,507,374 B1
(45) Date of Patent: Jan. 14, 2003

(54) CONVERGENCE ADJUSTING METHOD, SIGNAL GENERATING APPARATUS, AND PROJECTION DISPLAY UNIT

(75) Inventors: Yoshito Miyatake, Neyagawa (JP); Tsutomu Muraji, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/340,409

(22) Filed: Jun. 28, 1999

(30) Foreign Application Priority Data

Jul. 1, 1998 (JP) ............................. 10-186621

(51) Int. Cl.[7] .............................. H04N 3/22; H04N 3/23; H04N 3/226
(52) U.S. Cl. ....................................... 348/745; 348/746
(58) Field of Search ................................. 348/745–747, 348/806, 807, 189, 190, 191; 315/368.18; H04N 3/22, 3/23, 3/226, 3/26

(56) References Cited

U.S. PATENT DOCUMENTS 5,463,427 A * 10/1995 Kawashima ........... 315/368.11
5,532,764 A *  7/1996 Itaki ........................ 348/745

* cited by examiner

*Primary Examiner*—Michael H. Lee
(74) *Attorney, Agent, or Firm*—Smith, Gambrell & Russell, LLP

(57) ABSTRACT

Where a stack projection operation is carried out using first and second projection display units, it is arranged such that the first projection display unit projects a crosshatch pattern continuously in time while on the other hand, the second projection display unit projects a pattern identical with that crosshatch pattern such that the pattern flashes at given intervals of time. Thereafter, the state of superposition between the patterns projected from the two projection display units is examined to carry out inter-set convergence adjustment between the display units.

12 Claims, 13 Drawing Sheets

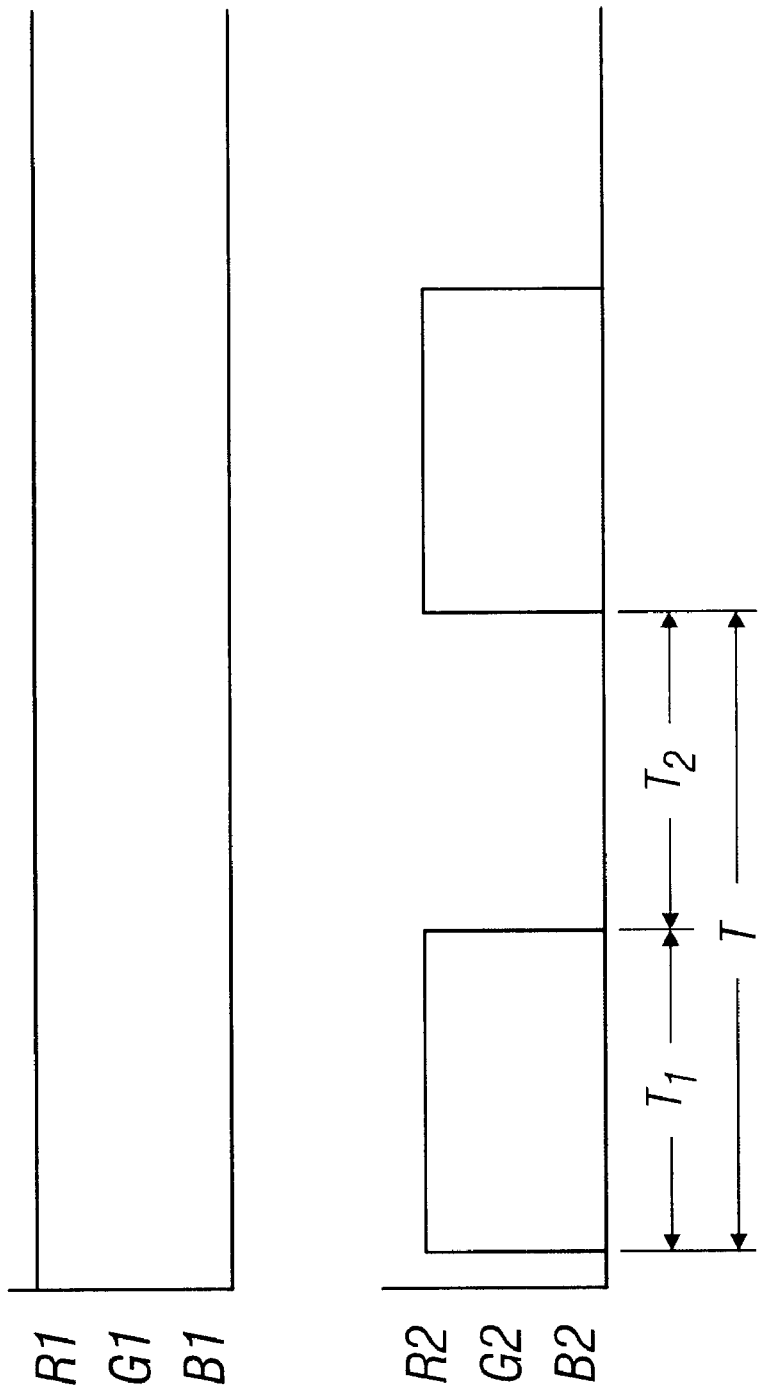

CONVERGENCE ADJUSTING METHOD, SIGNAL GENERATING APPARATUS, AND PROJECTION DISPLAY UNIT

BACKGROUND OF THE INVENTION

1. Field of the Invention

The present invention relates to a convergence adjusting method needed where a plurality of projection display units, which project respective images onto a projection screen, are used to overlap the projected images on the projection screen to provide a single projected image at a higher level of brightness. This invention further relates to signal generating apparatus and projection display units.

2. Description of the Prior Art

A method for the providing of a large-scale screen image has been well known in the art, in which an optical image according to a video signal is formed on a light valve. Thereafter, the optical image thus formed is illuminated with light to be projected enlargedly onto a large-scale projection screen by a projection lens. In recent years, projection display units using liquid-crystal panels as light valves have attracted considerable attention. For example, Ono and others disclose a liquid-crystal projection display unit (Japanese Patent Laid-Open No. S62-133424), to provide a projected image of high quality by employing three active matrix liquid-crystal panels for three kinds of colors (red, green, and blue), each pixel thereof being provided with a TFT acting as a switching element. As a liquid-crystal panel material, twisted nematic (TN) liquid-crystal has been used widely owing to its ability to provide images of high quality. Because of improvements of an aperture ratio in the liquid-crystal panel and because of the development of small-sized lamps of high luminance, a typical latest projection display unit is able to provide much improved optical output than previously.

Additionally, a method for use by a display unit installed at an exhibition hall or the like has been known, in which projected images are overlapped or superposed on one another on a projection screen using a plurality of projection display units, for providing a single projected image at a much higher level of brightness. Hereinafter, such a method will be called the "stack projection" technique. For instance, Noda proposes a technique for performing a stack projection operation with a plurality of liquid-crystal projection display units (Japanese Patent Laid-Open No. H05-107639). In addition, stack projection is employed where images which are thrown for right and left human eyes are projected using two projection display units for achieving a large-scale screen stereoscopic display.

However, in the case a plurality of projection display units are used to carry out stack projection of images, it is required that some adjustment work be made at the job site such as an exhibition hall for overlapping a plurality of projected images on one another on the projection screen.

Accordingly, in a conventional projection-type displaying technique, two projection display units are fed the same video signal to project identical crosshatch patterns onto a projection screen, wherein inter-set convergence adjustment is carried out by moving a projection display unit by a very slight amount or by moving a projection lens by a very slight amount, to reduce a degree of misregistration between the two crosshatch patterns over the entire projection screen.

Conventionally, convergence adjustment has been carried out in the following two ways.

In the first convergence adjusting method, one projection display unit displays a red crosshatch pattern and the other projection display unit displays a green crosshatch pattern, wherein inter-set convergence adjustment is performed to reduce a degree of misregistration between the red crosshatch pattern and the green crosshatch pattern. Next, the two projection display units display respective crosshatch patterns of white lines to confirm a resulting convergence state. If the convergence state thus confirmed is found to be unsatisfactory, another inter-set convergence adjustment operation is performed by redisplaying a red and a green crosshatch pattern. These operations are repeatedly performed until the point the misregistration between the crosshatch patterns displayed on the projection screen cannot be reduced to a further degree.

In the second convergence adjusting method, inter-set convergence adjustment is roughly performed using a red and a green crosshatch pattern. This is followed by the displaying of crosshatch patterns of white lines by the two projection display units. Performing adjustment with the aid of the displayed white-line crosshatch patterns, a final fine convergence adjustment process is carried out.

In each of the first and second convergence adjusting methods, crosshatch patterns of white lines are displayed to confirm a convergence state for the following reason. If crosshatch patterns of red, green, and blue, each projected from a single projection display unit, are precisely superposed upon one another, the projecting of any one of red, green, and blue crosshatch patterns may be considered equivalent to the projecting of a white-line crosshatch pattern. However, practically, there is produced slight misconvergence between projected red, green, and blue images due to the system assembly error and the magnification chromatic aberration. To cope with such misconvergence, it is necessary that the adjustment previously described is performed.

The first convergence adjusting method enables the operator to easily determine, based on the difference in line color between projected crosshatch patterns, which part of which projection display unit should be adjusted. However, the first convergence adjusting method is troublesome to carry out and such adjustment is very time consuming.

On the other hand, in the second convergence adjusting method, the two projection display units each display a crosshatch pattern of white lines in the fine adjustment phase, which makes it possible to detect misregistration between the crosshatch patterns. However, the problem of the second convergence adjusting method is that it is impossible to determine which part of which projection display unit should be adjusted. This may lead to another problem that a portion required to be adjusted is moved opposite. Such misadjustment may result in producing a poor inter-set convergence adjustment result in comparison with the adjustment result prior to the final fine adjustment. If such an undesired situation takes place, it takes quite a long time to perform necessary adjustment operations.

As described above, conventional inter-set convergence adjusting operations are very troublesome to perform and time consuming. This problem becomes more and more serious as the number of projection display units increases.

There is another type of projection display unit, namely a CRT projection display unit employing a CRT in which an image displayed on the CRT is enlargedly projected with a projection lens. Even when using a plurality of CRT projection display units to perform a stack projection operation, the same problem as above arises, in other words inter-set convergence adjustment becomes considerably troublesome to perform.

SUMMARY OF THE INVENTION

Bearing in mind the above-described problems with the prior art projection display units, the present invention was made. Accordingly, an object of the present invention is to provide an improved convergence adjusting method capable of facilitating convergence adjustment in a stack projection operation.

It is another object of the present invention to provide a projection display unit and a signal generating apparatus for facilitating, based on the convergence adjusting method of the present invention, convergence adjustment work in a stack projection operation.

The present invention is a convergence adjusting method which is employed where a plurality of projection display units are used to project identical images for mutual superposition, said convergence adjusting method comprising the steps of:
(a) causing a first one of said plurality of projection display units that serves as a reference to continuously project a first pattern,
(b) causing a second one of said plurality of projection display units to alternately periodically project a pattern identical with said first pattern and a second pattern different from said first pattern,
(c) adjusting convergence between said two projection display units on the basis of a state of superposition between said patterns projected from said first and second projection display units, and
(d) carrying out, in the same way as above, adjustment in convergence between said reference projection display unit and each of the remaining projection display units.

The present invention is a signal generating apparatus comprising:
(a) a first output terminal for continuously providing video signals for a first pattern, and
(b) a second output terminal for providing video signals so that a pattern identical with said first pattern and a second pattern different from said first pattern are periodically repeated in an alternating manner.

The present invention is a projection display unit comprising:
(a) a display unit for forming an image according to a video signal,
(b) a projection lens for projecting said image formed on said projection display unit onto a projection screen, and
(c) a signal generating apparatus for providing a pattern for convergence adjustment by making use of said projection display unit and said projection lens,
wherein said signal generating apparatus selects, based on a selection command, between (1) a first video signal for continuously displaying a first pattern and (2) a second video signal for alternately periodically displaying a pattern identical with said first pattern and a second pattern different from said first pattern, for providing said convergence adjustment pattern.

The present invention is a convergence adjusting method which is employed where a plurality of projection display units are used to project identical images for mutual superposition, said convergence adjusting method comprising the steps of:
(a) causing first and second ones of said plurality of projection display units to project respective patterns identical in shape but different in line type, said first projection display unit serving as a reference,
(b) adjusting convergence between said projected images on the basis of a state of superposition between said patterns projected from said first and second projection display units, and
(c) carrying out, in the same way as above, adjustment in convergence between said reference projection display unit and each of the remaining projection display units by causing each of said remaining projection display units to project a pattern different in line type from said pattern projected from said reference projection display unit.

The present invention is a signal generating apparatus comprising:
(a) a first output terminal, and
(b) a second output terminal,
wherein said first and second output terminals provide video signals for displaying their respective patterns identical in shape but different in line type.

The present invention is a projection display unit comprising:
(a) a display unit for forming an image according to a video signal,
(b) a projection lens for projecting said image formed on said display unit onto a projection screen, and
(c) a signal generating apparatus for providing a pattern for convergence adjustment by making use of said display unit and said projection lens,
wherein said signal generating apparatus selectively projects, based on a selection command, a particular one of various crosshatch patterns of different line types.

The present invention is a convergence adjusting method which is employed where a plurality of projection display units are used to project identical images for mutual superposition; said convergence adjusting method comprising the steps of;
wherein patterns to be projected by said plurality of projection display units are identical in shape but different, when viewed in time, in projection time zone and/or in line type among said plurality of projection display units, and
wherein by making utilization of said difference, adjustment of convergence between projection display units is carried out.

In accordance with the convergence adjusting method, the signal generating apparatus, and the projection display unit of the present invention, when using a plurality of projection display units to execute a stack projection operation, it becomes easy for the operator to determine which crosshatch pattern displayed on the projection screen is projected from which projection display unit, thereby providing the effect that inter-set convergence adjustment can be performed in an easier way. Accordingly, it becomes possible to provide a large-size, brighter, highly-converged, high-quality projected image.

Other features and operation of the present invention will appear more fully from the following detailed description of embodiments with reference to the accompanying drawings.

BRIEF DESCRIPTION OF THE DRAWINGS

FIGS. 5–7 are waveform diagrams showing output signal waveforms of the signal generating apparatus in the second embodiment of the present invention.

DESCRIPTION OF THE PREFERRED EMBODIMENTS

A first embodiment of a convergence adjusting method in accordance with the present invention will be described below. The present embodiment is applied to cases where stack projection is carried out for the superposition of images projected from two projection display units on a large-scale projection screen installed in an exhibition hall or the like, wherein the operator performs convergence adjustment on the two projection display units.

Figure 1:
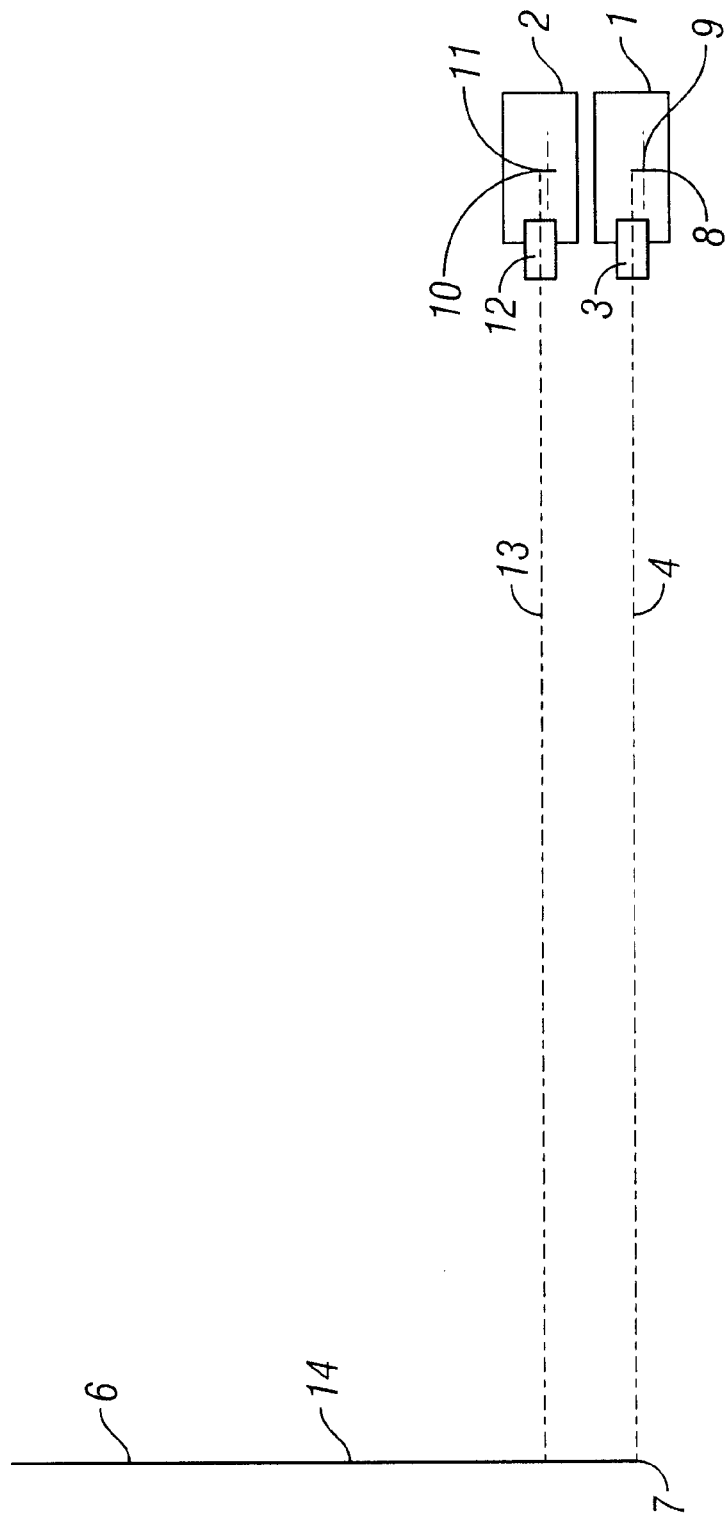
FIG. 1 is a diagram roughly illustrating a structure of a projection display unit to which a convergence adjusting method in a first embodiment of the present invention is applied.

Referring first to FIG. 1, there is roughly shown a structure of a projection display unit to which a convergence adjusting method of the present invention is applied. Two projection display units 1 and 2 are vertically arranged. In the lower projection display unit 1, an optical axis 4 (i.e., the optical axis of a projection lens 3) is shifted upwardly with respect to a screen center 9 (i.e., the center of a display area of a liquid-crystal panel 8) in order for the optical axis 4 of the projection lens 3 to pass through a lower end 7 of a projected image 6 displayed on a projection screen. Also, in the upper projection display unit 2, an optical axis 13 (i.e., the optical axis of a projection lens 12) is shifted upwardly with respect to a screen center 11 (i.e., the center of a display area of a liquid-crystal panel 10), for the overlapping of two projected images. To prevent the projected image 6 from being obstructed by the two projection display units 1 and 2, the projection display units 1 and 2 are disposed at a lower level than a screen center 14 (i.e., the screen center of the projected image 6). The two projection display units 1 and 2 enlargedly project identical projection images onto the projection screen. Here, the two projection display units 1 and 2 are used and their respective projected image 6 are overlapped on each other thereby to provide an overlapped projected image the brightness of which is twice the case in which only one projection display unit is used. In the present embodiment, each liquid-crystal panel 8 and 10 is formed of 1024 pixels (in horizontal direction)×768 pixels (in vertical direction), has a horizontal pixel pitch of 36 μm and a vertical pixel pitch of 36 μm, and has a display area of 36.86 mm (horizontal dimension)×27.65 mm (vertical dimension) with a 1.18-inch diagonal length. In addition, the size of projected images is 200 inches in diagonal length (4.06 m (horizontal dimension)×3.05 mm (vertical dimension)).

Figure 12:
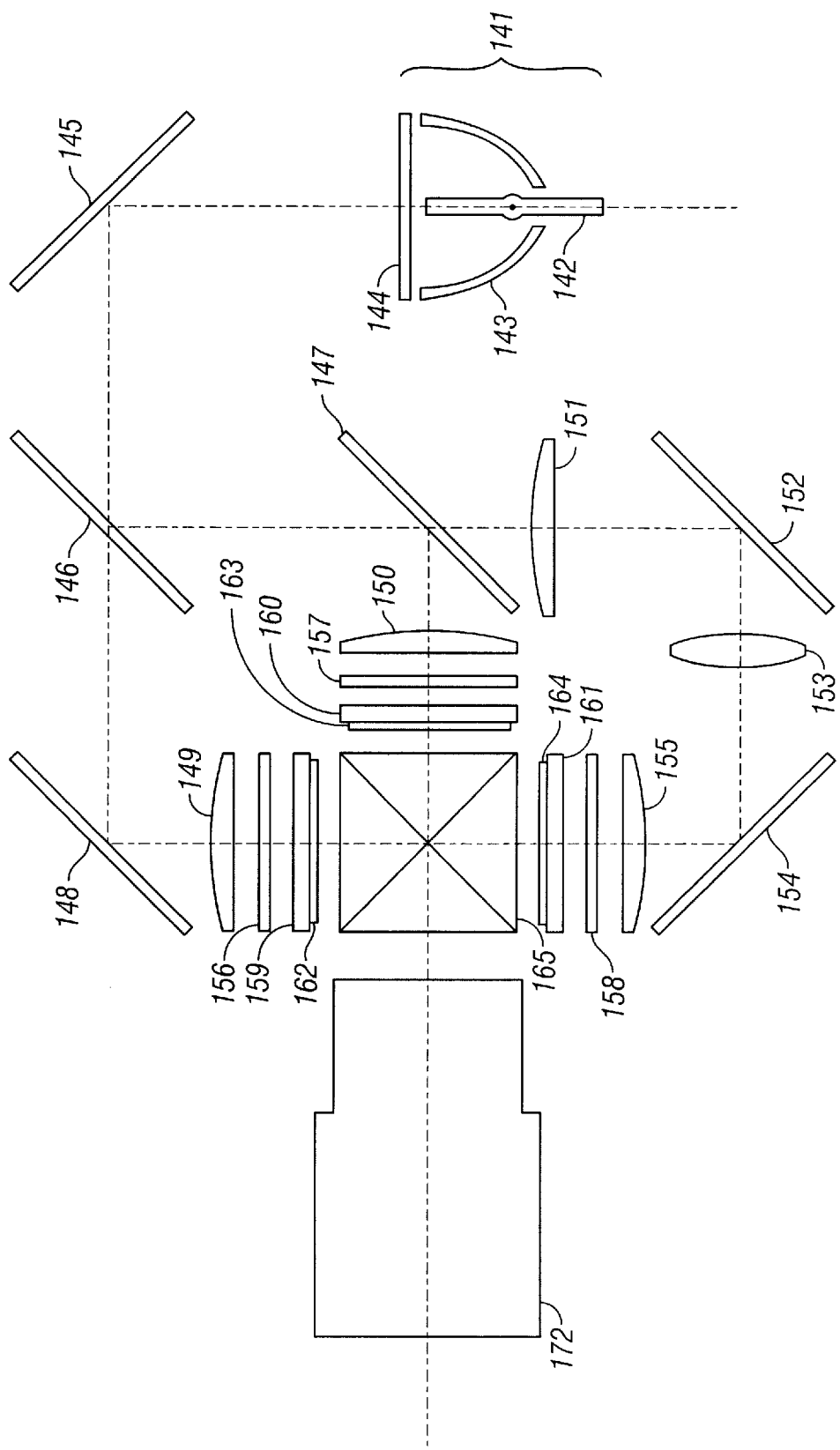
FIG. 12 is a diagram showing details of the projection display unit of FIG. 1.

FIG. 12 shows in detail the structure of the projection display units 1 and 2. Referring to FIG. 12, there are shown the following components: a light source 141, dichroic mirrors 146 and 147, field lenses 149, 150, and 155, relay lenses 151 and 153, polarizing plates 156–158 and 162–164, liquid-crystal panels 159–161, a color combining prism 165, and a projection lens 172.

The light source 141 is made up of a lamp 142 and a concave mirror 143. The lamp 142 is implemented by a metal halide lamp and emits light containing three primary color components. The concave mirror 143 is implemented by an ellipsoid mirror. Light emitted from the lamp 142 is reflected by the concave mirror 143, exiting in the form of almost parallel rays of light with infrared light removed.

Visible light, contained in the outgoing light from the light source 141, passes through a filter 144 and is reflected by a cold mirror 145. The filter 144 is formed by vapor deposition of an optical multi-layered film (which passes visible light and reflects infrared and ultraviolet radiation) on a substrate of glass. On the other hand, the cold mirror 145 is formed by vapor deposition of an optical multi-layered film (which reflects visible light and passes infrared radiation) on a substrate of glass.

The light reflected by the cold mirror 145 strikes upon the blue-light transmitting dichroic mirror 146, and of the light incident upon the blue-light transmitting dichroic mirror 146, blue light is allowed to pass through, while red light and green light are reflected to fall upon the green-light reflecting dichroic mirror 147. Of the light incident upon the green-light reflecting dichroic mirror 147, the red light is allowed to pass through, while the green light is reflected. Meanwhile, the blue light, which has passed through the blue-light transmitting dichroic mirror 146, is reflected by a plane mirror 148 to fall upon the field lens 149. The green light, which has been reflected by the green-light reflecting dichroic mirror 147, directly falls upon the field lens 150. The red light, which has passed through the green-light reflecting dichroic mirror 147, passes through the first relay lens 151, a plane mirror 152, the second relay lens 153, and a plane mirror 154 in that order, thereafter striking upon the field lens 155. The light exiting from the field lens 149 passes through the entrance-side polarizing plate 156, thereafter falling upon the corresponding liquid-crystal panel 159. The light exiting from the field lens 150 passes through the entrance-side polarizing plate 157, thereafter falling on the corresponding liquid-crystal panel 160. The light exiting from the field lens 155 passes through the entrance-side polarizing plate 158, thereafter falling on the corresponding liquid-crystal panel 161.

Formed, in response to a video signal, on each liquid-crystal panel is an optical image as a variation in optical activity. Each of the field lenses 149, 150 and 155 is disposed to direct principal rays incident upon peripheral pixels thereof so that these principal rays become perpendicular to each liquid-crystal layer.

Light rays exiting from the liquid-crystal panels 159–161 pass through the exit-side polarizingplates 162–164, respectively, thereafter falling upon the color combining prism 165. The color combining prism 165 is formed as follows. Red-light reflecting dichroic multi-layered films and blue-light reflecting dichroic multi-layered films are provided on inclines of four triangular prisms. These four triangular prisms are joined together such that each red-light reflecting dichroic multi-layered film intersects its corresponding blue-light reflecting dichroic multi-layered film, forming a shape of character X. Three primary color light rays incident upon the color combining prism 165 are combined by the red- and blue-light reflecting dichroic multi-layered films to a single light ray which then falls upon the projection lens 172.

In this way, the optical images, formed in the three liquid-crystal panels 159–161, are enlargedly projected by the projection lens 172 onto the projection screen arranged at a distance therefrom.

Figure 2A:
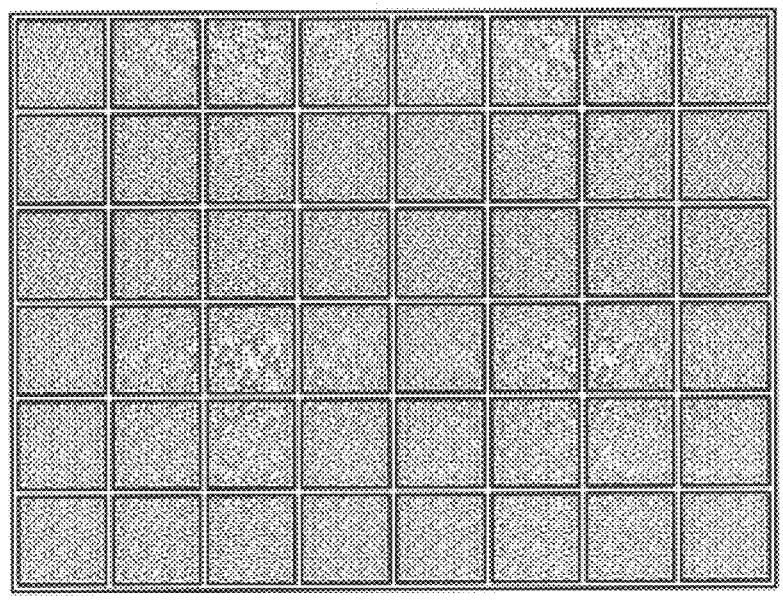
FIG. 2 is a diagram roughly illustrating crosshatch patterns which are used in the convergence adjusting method in the first embodiment of the present invention.
Figure 2B:
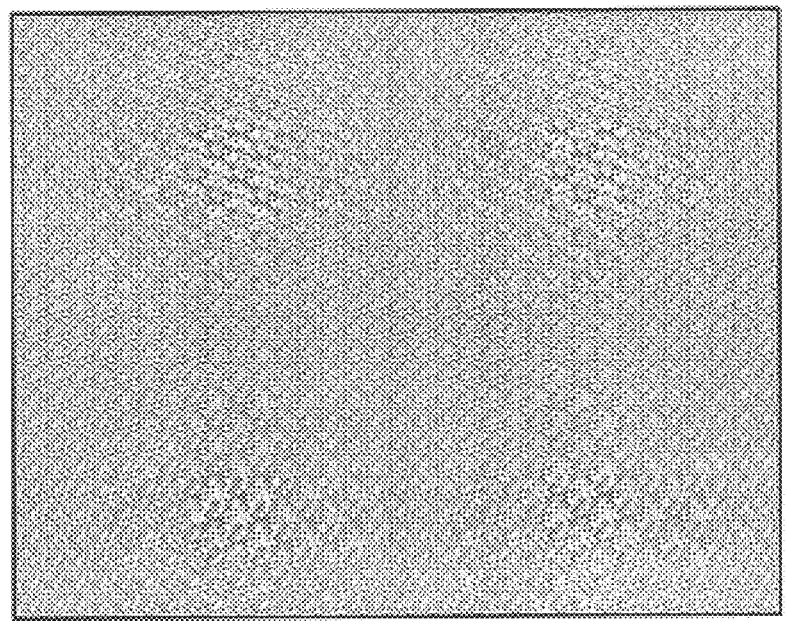

Referring now to FIG. 2, there are shown two types of crosshatch patterns for use in inter-set convergence adjustment in accordance with the convergence adjusting method of the present invention. It is arranged such that the lower projection display unit 1 continuously projects a crosshatch pattern of white lines on a black background as shown in FIG. 2(a). On the other hand, the upper projection display unit 2 alternately periodically projects a crosshatch pattern identical with the one shown in FIG. 2(a) and a full-black pattern as shown in FIG. 2(b). Here, the continuously-displayed crosshatch pattern is called the continuous crosshatch pattern, while the periodically-displayed crosshatch pattern is called the flashing crosshatch pattern. The flashing cycle of the flashing crosshatch pattern is set such that the crosshatch pattern is projected for three seconds and thereafter the full-black pattern is projected for three seconds. The crosshatch pattern of FIG. 2(a) has a screen area of 1024 horizontal pixels×768 vertical pixels which includes nine white lines extending in vertical direction and seven white lines extending in horizontal direction. The width of these vertical and horizontal white lines is one pixel long and the outermost periphery of the crosshatch pattern of FIG. 2(a) is defined by white lines. The white-line pitch is 127 pixels at the right-hand end area and at the lower end area, and 128 pixels at the remaining other areas.

Such arrangement enables the operator to easily distinguish, even when both of two projected crosshatch patterns have a line color of white, between these two white-line crosshatch patterns. That is to say, of the two crosshatch patterns, a continuous one can be identified as a crosshatch pattern projected from the lower projection display unit 1, and on the other hand, a flashing one can be identified as a crosshatch pattern projected from the upper projection display unit 2. More specifically, while visually inspecting pattern images projected onto the projection screen, the operator (i) adjusts the display size of the projected images by performing zoom adjustment of the projection lens 12, (ii) establishes a correspondence of the centers of the projected images by movement of the entire upper projection display unit 2 and by vertical shift of the projection lens 12, and (iii) adjusts the horizontal tilt angle of the projected images by adjusting the tilt angle of the projection display unit 2 in the horizontal direction, so that the flashing crosshatch pattern overlaps on the continuous crosshatch pattern. As a result, convergence adjustment can be carried out without difficulties.

The use of the convergence adjusting method of the present invention provides the following advantages. First, the present convergence adjusting method considerably facilitates adjustment work, for the operator can easily determine which of two types of crosshatch patterns is projected from which projection display unit in the inter-set convergence adjustment for the case of a stack projection operation. Furthermore, it is possible to use, from the beginning of adjustment work, a crosshatch pattern of white lines on a black background to perform adjustment of the inter-set convergence, without changing the line color of crosshatch patterns which are projected by two projection display units to a primary color during the convergence adjustment. This makes it possible to perform convergence adjustment at a best balance in a short time while taking into account even a slight misconvergence between red (R), green (G), and blue (B) of each projection display unit due to the lens magnification chromatic aberration or the like. In other words, it becomes unnecessary to perform rough adjustment for colors (e.g., a color of green) described in the description of the prior art projection display unit.

Additionally, if there exists a slight difference in alignment between two crosshatch patterns, there is a decrease in line width for a period of time in which no crosshatch pattern is projected by the upper projection display unit 2, while on the other hand there is an increase in line width for a period of time in which the projection display unit 2 projects a crosshatch pattern. Accordingly, by visually inspecting such a change in line width, it is easy to find out portions which require convergence adjustment on a projected image. Furthermore, by visually inspecting the direction in which the line width of a crosshatch pattern increases, it becomes easy to determine the direction in which a projected image by the upper projection display unit should be shifted.

As described above, the use of the convergence adjusting method according to the present invention makes it possible to easily perform convergence adjustment for the case of the stack projection.

For the case of performing stack projection with three or more projection display units, it is sufficient to repeat an inter-set convergence operation by causing a first projection display unit serving as a reference to project a continuous crosshatch pattern and by causing the remaining projection display units to project, by turns, a flashing crosshatch pattern. In such a case, all the projection display units may be made to flash as long as they are assigned different flashing time zones.

Figure 3:
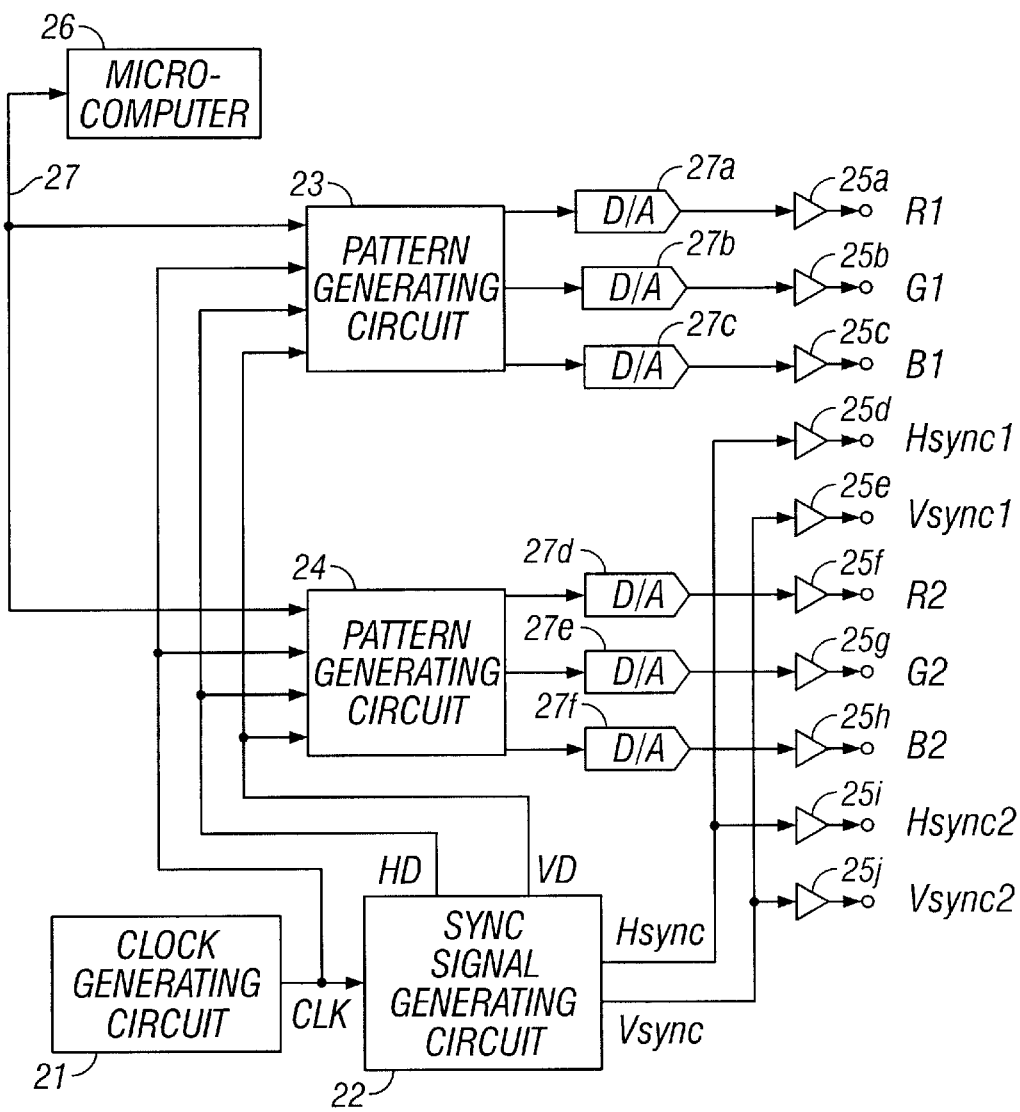
FIG. 3 shows in block form a structure of a signal generating apparatus in a second embodiment of the present invention.

FIG. 3 shows the structure of a first embodiment of the signal generating apparatus in accordance with the present invention. The signal generating apparatus of the present embodiment is built in each projection display unit previously described in the first embodiment of the convergence adjusting method of the present invention.

A clock generating circuit 21 is disposed to generate, with the aid of a quartz oscillator, a high-precision clock signal CLK. The clock signal CLK is applied to a synchronization (sync) signal generating circuit 22 as well as to two pattern generating circuits 23 and 24.

The sync signal generating circuit 22 provides the following four signals: a horizontal sync signal Hsync; a vertical sync signal Vsync; a horizontal scan starting signal HD; and a vertical scan starting signal VD. The horizontal scan staring signal HD is applied to the two pattern generating circuits 23 and 24. The vertical scan staring signal VD is applied to the two pattern generating circuits 23 and 24. The horizontal sync signal Hsync is divided into two parts which are output with the output impedance reduced by corresponding amplifiers 25d and 25i. Like the signal Hsync, the vertical sync signal Vsync is divided into two parts which are output with the output impedance reduced by corresponding amplifiers 25e and 25j.

The two pattern generating circuits 23 and 24 and the sync signal generating circuit 22 are formed by a field programmable gate array (FPGA), wherein control commands are delivered through a control bus 27 to the signal generating circuits 23 and 24 from a microcomputer 26.

Figure 4A:
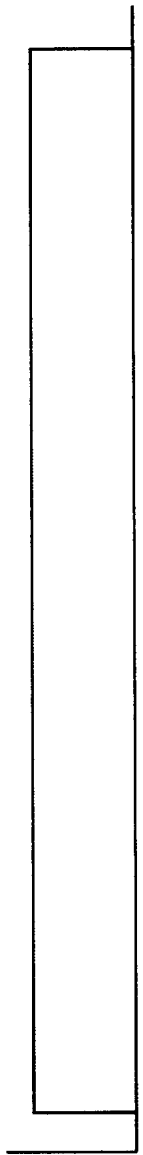
FIG. 4 is a waveform diagram illustrating waveforms generated in a pattern generating circuit of the signal generating apparatus in the second embodiment of the present invention.
Figure 4B:
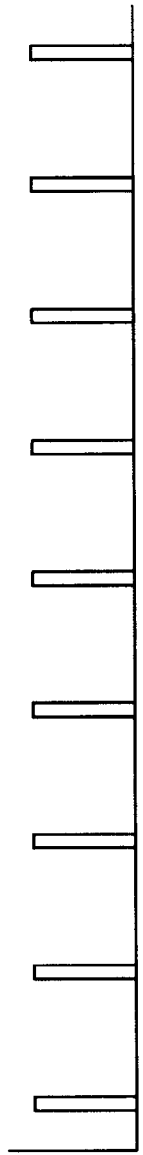
Figure 4C:
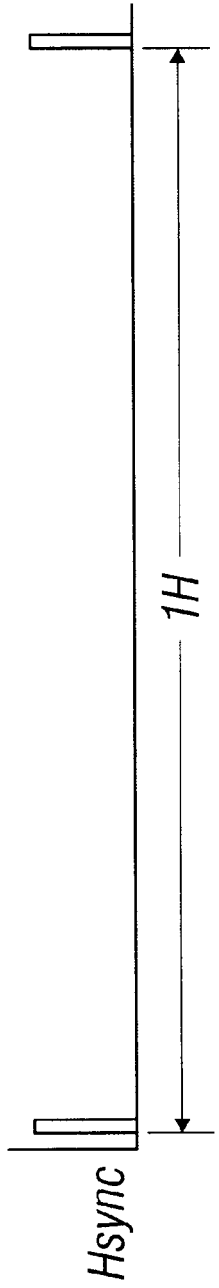

The pattern generating circuit 23 continuously generates video signals for a crosshatch pattern as shown in FIG. 2(a). A concrete example of the waveforms is shown in FIG. 4. Referring to FIG. 4(a), during a horizontal-line displaying period, the level is continuously held HIGH for a horizontal scan period 1H. On the other hand, as can be seen from FIG. 4(b), during a vertical-line displaying period, the level is placed in the state of HIGH for a short period of time corresponding to a vertical line, but otherwise the level is placed in the state of LOW. FIG. 4(c) is the horizontal sync signal Hsync provided from the sync signal generating circuit 22. The pattern generating circuit 23 continuously provides red, green, and blue video signals for a crosshatch pattern as shown in FIG. 2(a). On the other hand, the pattern generating circuit 24 generates red, green, blue video signals so that a crosshatch pattern identical with one generated in the pattern generating circuit 23 and a full-black pattern as shown in FIG. 2(b) are alternately periodically projected. For example, flashing is made to take place at intervals of three seconds. It is preferred that flashing takes place at equal intervals of time, because such equal interval flashing can be achieved easily by circuit design. The pattern generating circuit 23 provides video signals for a continuous crosshatch pattern and the pattern generating circuit 24 provides video signals for a flashing crosshatch pattern. Each of the red, green, blue video signals from the pattern generating circuit 23 and each of the red, green, blue video signals from the pattern generating circuit 24 are subjected to digital/analog conversion by D/A converters 27a–27f. These converted analog signals are output with the output impedance reduced by amplifiers 25a–25c and 25f–25h.

As control commands that are issued by the microcomputer 26, a flashing cycle control command for the flashing crosshatch pattern, a first line-color control command for the continuous crosshatch pattern, and a second line-control command for the flashing crosshatch pattern are prepared. The flashing period of the flashing crosshatch pattern can be changed to any value by the flashing cycle control command. Each of the three different video signals from the signal generating circuit 23 can be set either for the continuous crosshatch pattern or for the full-black pattern by the first line-color control command. Additionally, Each of the three different video signals from the signal generating circuit 24 can be set either for a flashing crosshatch pattern or for a full-black pattern by the second line-color control command. That is to say, by virtue of the first and second line-color commands, it becomes possible to set the line color of each of the continuous and flashing crosshatch patterns to any one of colors including white, red, green, blue, yellow, cyan, and magenta.

Five different signals (i.e., a first red video signal R1, a first green video signal G1, a first blue video signal B1, a first horizontal sync signal Hsync1, and a first vertical sync signal Vsync1) together form a first signal group for the displaying of a continuous crosshatch pattern. Another five different signals (i.e., a second red video signal R2, a second green video signal G2, a second blue video signal B2, a second horizontal sync signal Hsync2, and a second vertical sync signal Vsync2) together form a second signal group for the displaying of a flashing crosshatch pattern. The first and second signal groups are fed to the first projection display unit and to the second projection display unit, respectively.

Figure 5:
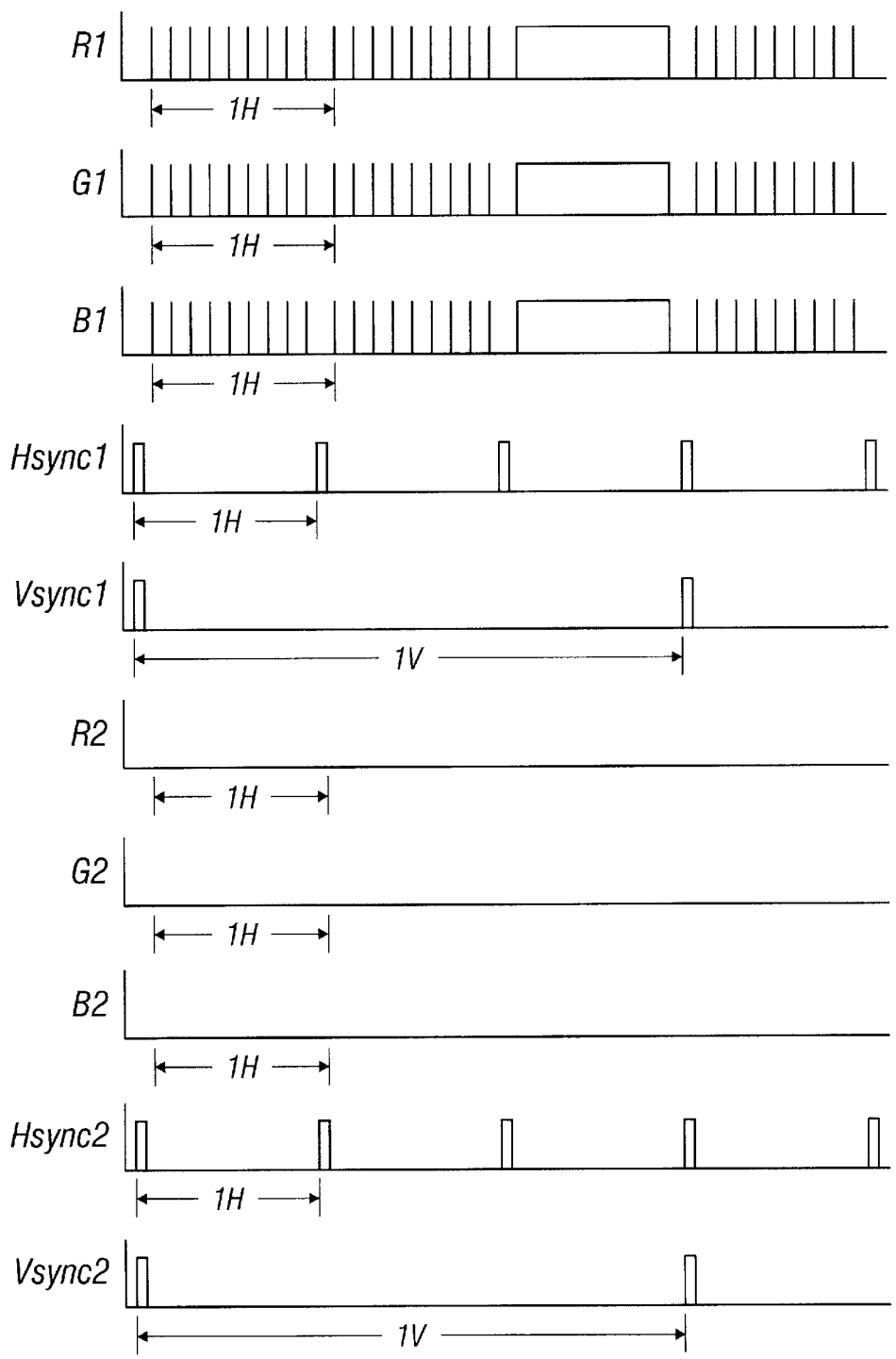
Figure 6:
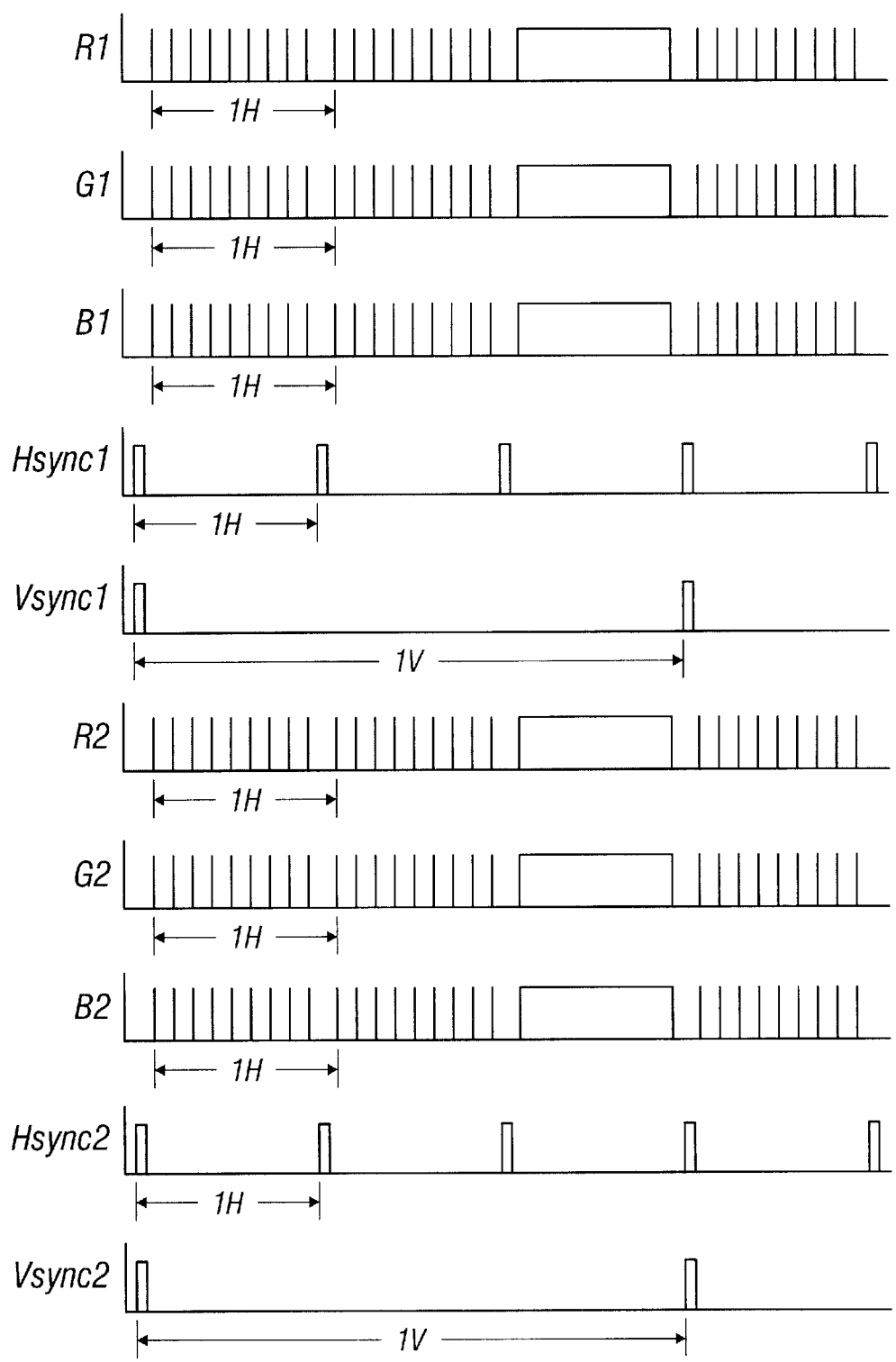

FIG. 5 shows waveforms of each output signal when each of first and second signal groups provided from the signal generating apparatus of FIG. 3 is for the displaying of a crosshatch pattern of white lines on a black background. On the other hand, FIG. 6 shows waveforms of each output signal when the signal generating apparatus of FIG. 3 provides a first signal group for the displaying of a crosshatch pattern of white lines on a black background, and a second signal group for the displaying of a full-black pattern. In FIGS. 5 and 6, 1H indicates a horizontal scan cycle and 1V indicates a vertical scan cycle. FIG. 7 shows waveforms of video signals of the first and second signal groups viewed in the scale of a flashing cycle T of the flashing crosshatch pattern. The first signal group continuously provides video signals for the displaying of a crosshatch pattern. On the other hand, the second signal group provides video signals for the displaying of a crosshatch pattern during a period T1, but it provides video signals for the displaying of a full-black pattern during a period T2. For instance, if green and blue video signals each assume the level of zero during all the periods, this results in display of a crosshatch pattern of red lines on a black background. On the other hand, if red and blue video signals each assume the level of zero during all the periods, this results in display of a crosshatch pattern of green lines on a black background.

The use of the above-described signal generating apparatus of the present invention provides some advantages. For example, in performing inter-set convergence adjustment at the time of stack projection, even if both of two crosshatch patterns have a line color of white, it is easy for the operator to determine which of the two crosshatch patterns is projected from which projection display unit, thereby considerably facilitating adjustment work. This makes it possible to use, from the beginning of adjustment work, a crosshatch pattern of white lines on a black background to perform inter-set convergence adjustment. Accordingly, it becomes possible to perform convergence adjustment at a best balance without difficulties. Additionally, the signal generating apparatus of FIG. 3 is operable to set the line color of continuous and flashing crosshatch patterns to any one of colors including white, red, green, blue, yellow, cyan, and magenta, whereby in performing inter-set convergence adjustment at the time of stack projection, an inter-set convergence state can be examined by primary colors (RGB). For example, if it is arranged such that two projection display units each project a crosshatch pattern of red lines on a black background, this makes it possible to confirm an inter-set convergence state of the red projected images. Furthermore, the function of selecting, as a crosshatch pattern's line color, any one of the foregoing seven colors, can be applied to adjustment of the convergence between RGB in a single projection display unit.

For the sake of easy understanding, the signal generating apparatus of FIG. 3 is configured to have two pattern generating circuits. However, most parts of the pattern generating circuit 24 can be shared with the pattern generating circuit 23.

A first embodiment of the projection display unit according to the present invention will be described below.

Figure 8A:
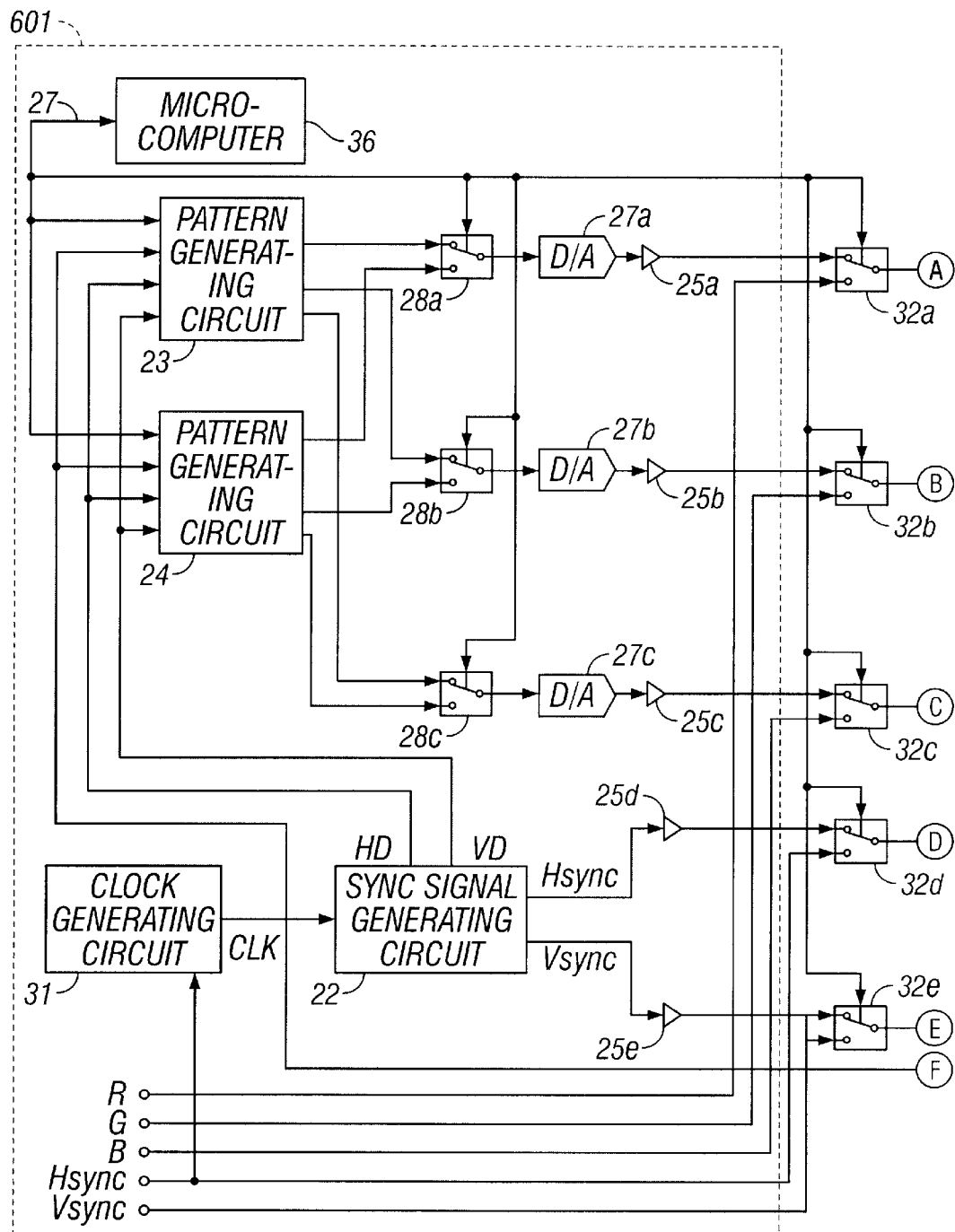
FIG. 8 shows in block form a structure of a circuit arranged in a projection display unit in a third embodiment of the present invention.
Figure 8B:
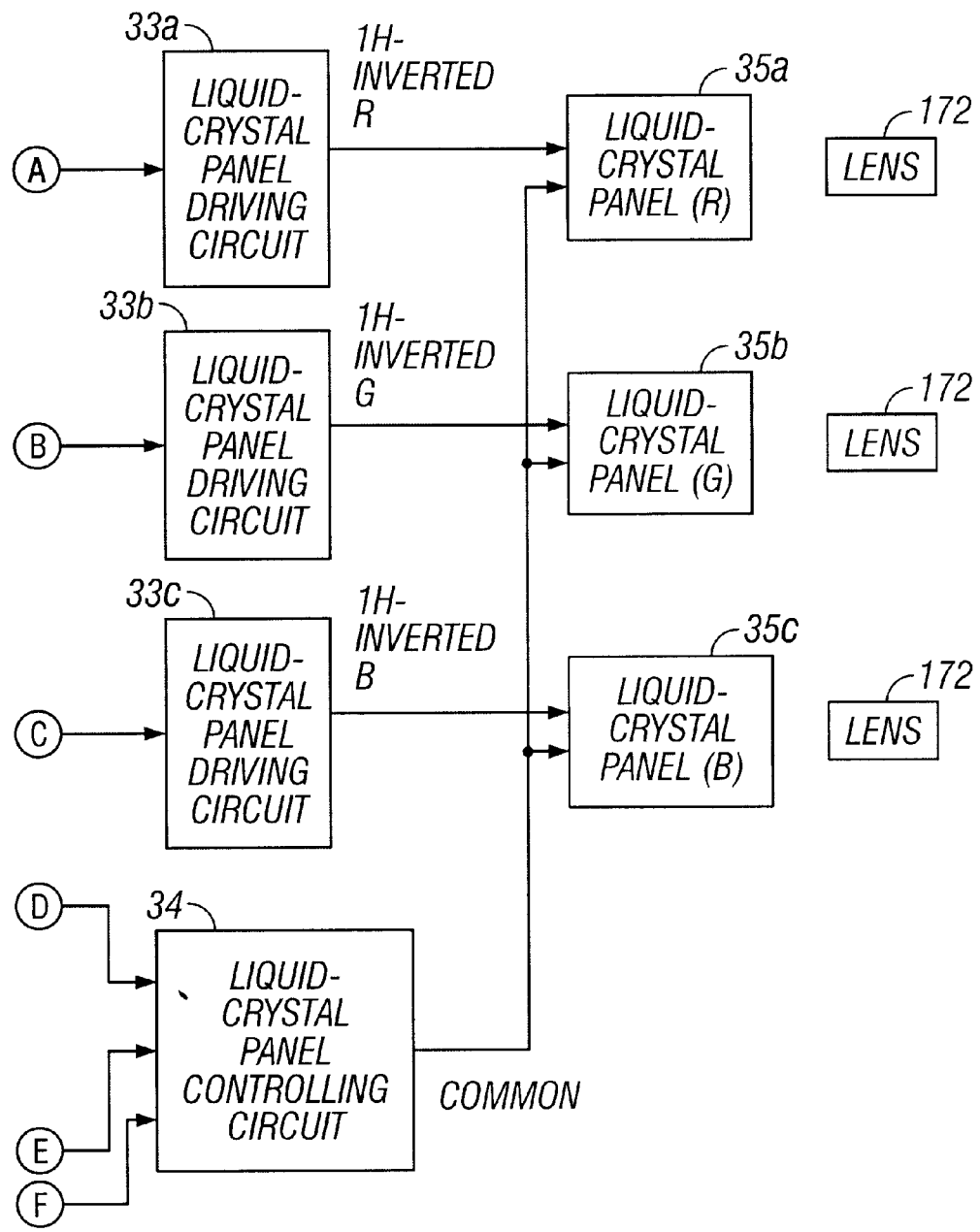

This projection display unit includes three liquid-crystal panels. The projection display unit is further provided with a circuit as shown in FIG. 8 for forming, according to a video signal, an optical image on each liquid-crystal panel. This circuit includes (i) a liquid-crystal panel display circuit for displaying images on the three liquid-crystal panels, (ii) a crosshatch pattern generating circuit 601 for generating a crosshatch pattern for use in inter-set convergence adjustment at the time of stack projection, and (iii) five switch circuits 32a–32e for switching between each external input video signal and the crosshatch pattern generating circuit. The 172 indicates a lens.

The crosshatch pattern generating circuit 601 is formed by addition of three switch circuits 28a–28c to the signal generating apparatus of FIG. 3, wherein the control commands of a microcomputer 36 are changed and output signals are reduced to only one signal group. A clock generating circuit 31 generates, with the aid of a quartz oscillator, a high-precision clock signal in the absence of input of an external horizontal sync signal, but in the presence of input of an external horizontal sync signal, it generates, with the aid of a PLL circuit, a clock signal based on the horizontal sync signal. Other structures are the same as in the signal generating circuit of FIG. 3.

Three different video signals provided from the pattern generating circuit 23 are applied to the three switch circuits 28a–28c, respectively. Likewise, another three different video signals provided from the pattern generating circuit 24 are applied to the three switch circuits 28a–28c, respectively. In response to a control command from the microcomputer 36, each switch circuit 28a–28c outputs one of its two inputs. Three different video signals, each of which is output from either one of the pattern generating circuits 23 and 24, are output from the three switch circuits 28a–28c. In other words, video signals for a continuous crosshatch pattern or video signals for a flashing crosshatch pattern are provided according to the setting of the microcomputer 36. Signals from the crosshatch pattern generating circuit, including a red video signal, a green video signal, a blue video signal, a horizontal sync signal, and a vertical sync signal, are fed to the switch circuits 32a–32e, respectively. In the case first and second projection display units are used to perform stack projection, each of the first and second display units is provided with a circuit as shown in FIG. 8, wherein the operator carries out operations to make setting such that the circuit of the first projection display unit provides video signals for a continuous crosshatch pattern while the circuit of the second projection display unit provides video signals for a flashing crosshatch pattern.

Where an external input video signal is used, a red video signal, a green video signal, a blue video signal, a horizontal sync signal, and a vertical sync signal are fed to five input terminals (R, G, B, Hsync, Vsync), respectively. These five signals are fed to the switch circuits 32a–32e, respectively. In response to a command from the microcomputer 36, each switch circuit 32a–32e provides either one of a signal group from the crosshatch pattern generating circuit and a group of external input signals.

Output video signals from the switch circuits 32a–32c are fed to a red liquid-crystal panel driving circuit 33a, to a green liquid-crystal panel driving circuit 33b, and to a blue liquid-crystal panel driving circuit 33c, respectively. An output horizontal sync signal from the switch circuit 32d, an output vertical sync signal from the switch circuit 32e, and an output clock signal from the clock generating circuit 31 are all fed to a liquid-crystal panel controlling circuit 34. Output signals from the liquid-crystal panel driving circuits 33a–33c are fed to corresponding signal supplying circuits of the liquid-crystal panels 35a–35c. An output signal from the liquid-crystal panel controlling circuit 34 is fed to common electrodes of the three liquid-panels 35a–35c. The liquid-crystal panel controlling circuit 34 provides a signal COMMON constant in voltage (the COMMON voltage). As output signals from the liquid-crystal panel driving circuits 33a–33c, signals, each of which is formed by addition of a direct current bias corresponding to the COMMON voltage to a signal which is inverted in polarity for each one horizontal cycle, are output for application of alternating current voltage to liquid-crystal layers of the liquid-crystal panels 35a–35c.

In order to carry out adjustment of the inter-set convergence at the time of stack projection, the microcomputer 36 is set such that the first projection display unit projects a continuous crosshatch pattern, and that the second projection display unit projects a flashing crosshatch pattern. As a result of such arrangement, it becomes possible for the operator to determine which projection display unit projects which crosshatch pattern without difficulties, therefore making it possible to perform inter-set convergence adjustment in a shorter period of time.

Generally, projection display units are provided with microcomputers for control of liquid-crystal panels, remote controllers, lamps, and the like. This facilitates addition of a crosshatch pattern generating circuit, shown in FIGS. 8(a) and 8(b), to a projection display unit.

A second embodiment of the convergence adjusting method of the present invention will be described below.

Figure 9A:
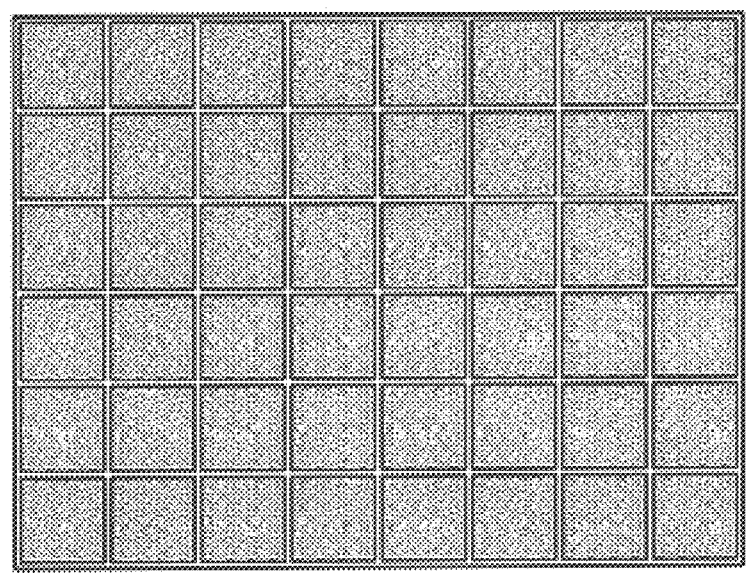
FIG. 9 is a diagram roughly illustrating crosshatch patterns which are used in a convergence adjusting method of a fourth embodiment of the present invention.
Figure 9B:
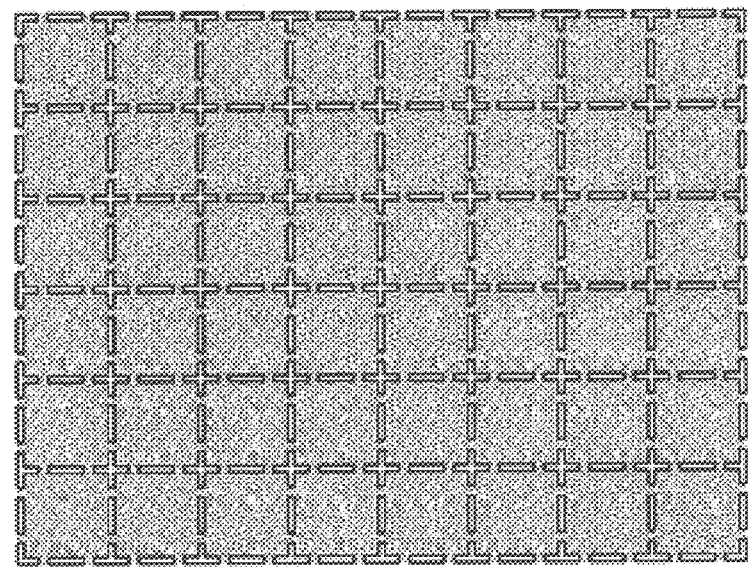

Referring to FIG. 9, there are illustrated two different crosshatch patterns which are employed in the present embodiment. It is arranged such that a first projection display unit continuously projects a crosshatch pattern of solid lines as shown in FIG. 9(a), while on the other hand a second projection display unit continuously projects a crosshatch pattern of broken lines as shown in FIG. 9(b). As a result of such arrangement, even if both the first and second projection display units project crosshatch patterns in white, it is possible for the operator to determine, from the difference in line type, which crosshatch pattern is projected from which projection display unit. Therefore, as in the first convergence adjusting method of the present invention, it is possible to carry out, in an easy way as well as in a short period of time, adjustment of the inter-set convergence at the time of stack projection.

The foregoing two crosshatch patterns are formed by a combination of solid line and broken line. However, they can be formed using two different types of lines (for example, a combination of solid line and alternate long and short dash line or a combination of solid line and chain line). It is preferable to employ a combination of solid line and equal-interval broken line.

Figure 10:
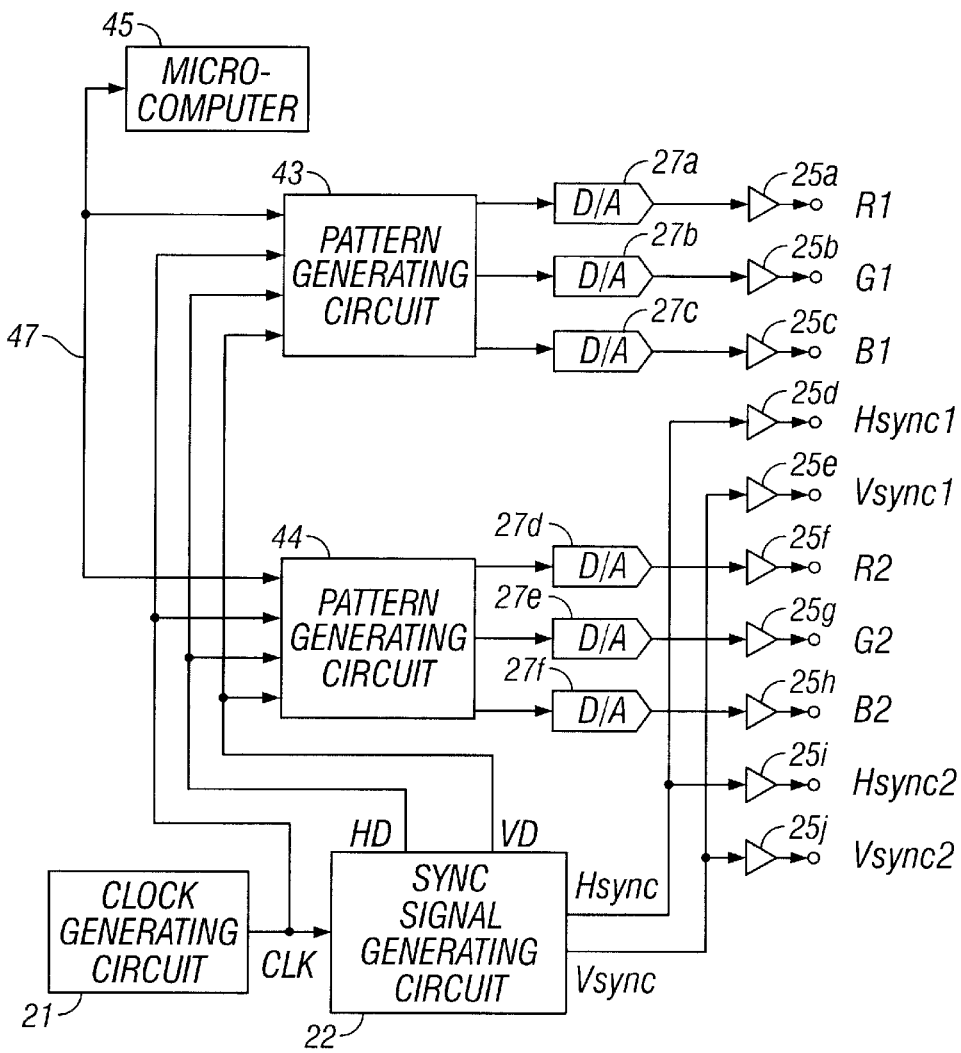
FIG. 10 shows in block form a structure of a signal generating apparatus in a fifth embodiment of the present invention.

Referring now to FIG. 10, there is shown the structure of a second embodiment of the signal generating apparatus of the present invention. The signal generating apparatus, shown in FIG. 10, is identical in structure with the one shown in FIG. 3 except for two pattern generating circuits and microcomputer control commands.

Figure 11A:
FIG. 11 is a waveform diagram illustrating waveforms generated in a pattern generating circuit of the signal generating apparatus of the fifth embodiment of the present invention.
Figure 11B:
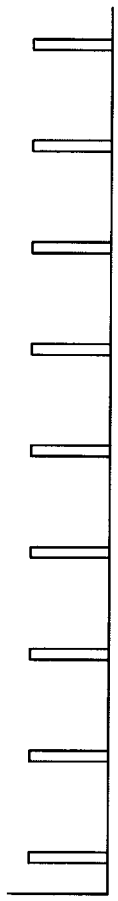
Figure 11C:
Figure 11D:
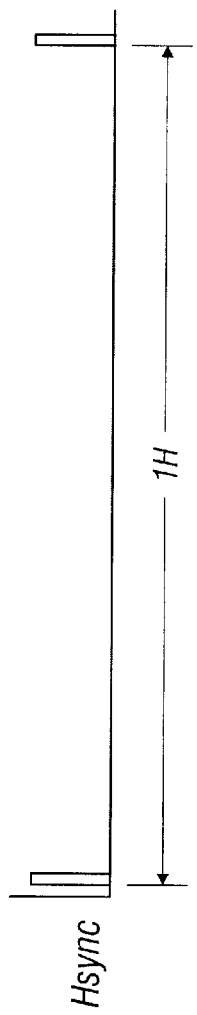

The pattern generating circuit 43 generates video signals for a solid-line crosshatch pattern identical with the one shown in FIG. 9(a) and the waveforms are the same as the ones shown in FIG. 4. On the other hand, the pattern generating circuit 44 generates video signals for a broken-line crosshatch pattern identical with the one shown in FIG. 9(b). A concrete example of waveforms within a horizontal scan period is shown in FIG. 11. During the horizontal-line displaying period, the level is always HIGH for a horizontal scan period, as shown in FIG. 11(a). On the other hand, during the vertical-line displaying period, the level is placed in the state of HIGH for a short period of time corresponding to a vertical line, but otherwise the level is LOW. During the broken-line's blank part displaying period, the level is always LOW, as shown in FIG. 11(c). FIG. 11(d) is the horizontal sync signal Hsync provided from the sync signal generating circuit 22.

As control commands that are issued from a microcomputer 45, a first line-color control command for solid-line crosshatch patterns and a second line-color control commands for broken-line crosshatch patterns are prepared. By virtue of the first line-color control command, it is possible to set each of three video signals provided from the signal generating circuit 43 to a solid-line crosshatch pattern or to a full-black pattern. Additionally, by virtue of the second line-color control command, it is possible to set each of three video signals provided from the signal generating circuit 44 to a broken-line crosshatch pattern or to a full-black pattern. In other words, the first and second line-color control commands make it possible to set the line color of solid- and broken line crosshatch patterns to any one of colors including white, red, green, blue, yellow, cyan, and magenta.

The above-described signal generating apparatus provides the advantage that even if two crosshatch patterns have the same line color of white in an inter-set convergence adjustment operation at the time of stack projection, the operator can determine which crosshatch pattern is projected from which projection display unit without difficulties, thereby considerably facilitating adjustment work. Furthermore, it is possible to perform, from the beginning of adjustment work, inter-set convergence adjustment with a crosshatch pattern of white lines on a black background, whereby convergence adjustment can be carried out at a best balance in an easy way.

The signal generating apparatus of FIG. 10 has the ability to set the line color of solid- and broken-line crosshatch patterns to any one of colors including white, red, green, blue, yellow, cyan, and magenta, which can be applied to adjustment of the convergence between RGB in a single projection display unit.

A second embodiment of the projection display unit of the present invention will be described below.

The second projection display unit is a modified form of the foregoing first projection display unit, in other words, part of the crosshatch pattern generating circuit is modified. More specifically, the pattern generating circuit 23 of FIG. 8 is modified to generate video signals for the displaying of a solid-line crosshatch pattern as shown in FIG. 9(a) and the pattern generating circuit 24 is modified to generate video signals for the displaying of a broken-line crosshatch pattern as shown in FIG. 9(b).

In order to carry out adjustment of the inter-set convergence at the time of stack projection, the microcomputer is set such that the first and second projection display units project a solid-line crosshatch pattern and a broken-line crosshatch pattern, respectively. Such arrangement enables the operator to easily determine which crosshatch pattern is projected from which projection display unit, whereby inter-set convergence adjustment can be carried out easily in a short period of time.

Each of the foregoing embodiments have been described in terms of projection display units using liquid-crystal panels as light valves. However, the convergence adjusting methods and the signal generating apparatus in accordance with the present invention can be applied to projection display units using light valves other than liquid-crystal panels as well as to projection display units using CRTs. In any one of these cases, inter-set convergence adjustment for the case of stack projection can be performed easily.

As described above, a plurality of projection display units are used to provide mutual superposition of projected images on a projection screen and the present invention relates to such a projection display unit. The present invention further relates to a convergence adjusting method, to a signal generating apparatus, and to a projection display unit including such a signal generating apparatus, for achieving reductions in the pixel misregistration between projected images. The present invention provides an improved convergence adjusting method capable of facilitating convergence adjustment during a stack projection operation. Additionally, the present invention provides an improved signal generating apparatus capable of facilitating convergence adjustment. Furthermore, the present invention provides an improved projection display unit capable of providing easy convergence adjustment during a stack projection operation.

In the previously-described case in which three or more projection display units are used to perform stack projection, an inter-set convergence operation is repeatedly carried out by causing a first projection display unit serving as a reference to project a continuous crosshatch pattern and by causing the remaining projection display units to project, by turns, a flashing crosshatch pattern. However, it is to be noted that the present invention is not limited to such an example case. For example, it is possible to employ a technique for performing inter-set convergence by causing a first projection display unit serving as a reference to project a continuous crosshatch pattern, by causing one of the remaining projection display units to project a flashing crosshatch pattern (see FIGS. 2(a) and 2(b)), and by causing another one of the remaining projection display unit to project a continuous crosshatch pattern different from the one projected from the first projection display unit (see FIG. 9(b) ). A signal generating apparatus adaptive to such a technique may be configured by adding to a signal generating apparatus as shown in FIG. 3 the pattern generating circuit 44, the D/A converters 27d–27f, and the amplifiers 25f–25j of FIG. 10. The pattern generating circuit of FIG. 3 generates a continuous crosshatch pattern of solid lines, the pattern generating circuit 24 generates a flashing crosshatch pattern of solid lines, and the pattern generating circuit 44 generates a continuous crosshatch pattern of broken lines.

To sum ups, what is further covered by the present invention is to arbitrarily combine the convergence adjusting method of the first embodiment and the convergence adjusting method of the second embodiment. In other words, in the case three or more projection display units are used to perform stack projection, of these projection display units, two projection display units project respective patterns identical in shape at different projection time zones or another two projection display units project respective patterns identical in shape but different in line type.

What is claimed is:

1. A convergence adjusting method which is employed where a plurality of projection display units are used to project identical images for mutual superposition, said convergence adjusting method comprising the steps of:

(a) causing a first one of said plurality of projection display units that serves as a reference to continuously project a first pattern, (b) causing a second one of said plurality of projection display units to alternately periodically project a pattern identical with said first pattern and a second pattern different from said first pattern, (c) adjusting convergence between said two projection display units on the basis of a state of superposition between said patterns projected from said first and second projection display units, and (d) carrying out, in the same way as above, adjustment in convergence between said reference projection display unit and each of the remaining projection display units.

2. The convergence adjusting method as claimed in claim 1, wherein said first pattern is a crosshatch pattern of white lines on a black background and wherein said second pattern is a full-black pattern.

3. The convergence adjusting method as claimed in claim 1, wherein the line color of each said pattern is variable.

4. The convergence adjusting method as claimed in claim 1, wherein the cycle of each said pattern is variable.

5. A signal generating apparatus comprising:
   (a) a first output terminal for continuously providing video signals for a first pattern, and
   (b) a second output terminal for providing video signals so that a pattern identical with said first pattern and a second pattern different from said first pattern are periodically repeated in an alternating manner.

6. The signal generating apparatus as claimed in claim 5, wherein said first pattern is a crosshatch pattern of white lines on a black background and wherein said second pattern is a full-black pattern.

7. The signal generating apparatus as claimed in claim 5, wherein the line color of each of said patterns displayed by said video signals provided from said first and second output terminals is variable.

8. The signal generating apparatus as claimed in claim 5, wherein the cycle of each of said patterns displayed by said video signals provided from said second output terminal is variable.

9. A projection display unit comprising:
   (a) a display unit for forming an image according to a video signal,
   (b) a projection lens for projecting said image formed on said projection display unit onto a projection screen, and
   (c) a signal generating apparatus for providing a pattern for convergence adjustment by making use of said projection display unit and said projection lens,
      wherein said signal generating apparatus selects, based on a selection command, between (1) a first video signal for continuously displaying a first pattern and (2) a second video signal for alternately periodically displaying a pattern identical with said first pattern and a second pattern different from said first pattern, for providing said convergence adjustment pattern.

10. The projection display unit as claimed in claim 9, wherein said first pattern is a crosshatch pattern of white lines on a black background and wherein said second pattern is a full-black pattern.

11. The projection display unit as claimed in claim 9, wherein the line color of each said projected pattern is variable.

12. The projection display unit as claimed in claim 9, wherein the cycle, in which said first and second patterns are alternately repeated, is variable.

* * * * *